(12) United States Patent
Naganathan et al.

(10) Patent No.: US 10,462,238 B1
(45) Date of Patent: Oct. 29, 2019

(54) REACHABILITY ANALYTICS FOR COMMUNICATIONS

(71) Applicant: SHORETEL, INC., Sunnyvale, CA (US)

(72) Inventors: Venkatraman Naganathan, Sunnyvale, CA (US); Prabjeet Singh, Sunnyvale, CA (US)

(73) Assignee: Mitel Networks, Inc.DE (US)

( * ) Notice: Subject to any disclaimer, the term of this patent is extended or adjusted under 35 U.S.C. 154(b) by 267 days.

(21) Appl. No.: 15/090,053

(22) Filed: Apr. 4, 2016

(51) Int. Cl.
*G06F 15/16* (2006.01)
*H04L 29/08* (2006.01)
*H04L 12/58* (2006.01)

(52) U.S. Cl.
CPC ............. *H04L 67/22* (2013.01); *H04L 51/34* (2013.01)

(58) Field of Classification Search
CPC ............................... H04L 67/22; H04L 51/34
See application file for complete search history.

(56) References Cited

U.S. PATENT DOCUMENTS

| | | | |
|---|---|---|---|
| 2009/0112993 A1* | 4/2009 | Miyamoto | G06Q 10/10 709/205 |
| 2014/0181001 A1 | 6/2014 | Cudak et al. | |
| 2015/0074259 A1* | 3/2015 | Ansari | H04L 67/02 709/224 |
| 2016/0277315 A1* | 9/2016 | Miller | G06F 16/9537 |

FOREIGN PATENT DOCUMENTS

WO 2006088631 8/2006

* cited by examiner

*Primary Examiner* — Dustin Nguyen
*Assistant Examiner* — Joel Mesa (57) ABSTRACT

A reachability engine can determine a reachability for a specified party in response to a request for reachability. The reachability can characterize a probability that the specified party will answer a request for communication using a specified mode of communication at a given time. The reachability can be based on status data that characterizes an aggregate of at least two of direct status data, indirect status data and historical status data for the specified party.

31 Claims, 6 Drawing Sheets

REACHABILITY ANALYTICS FOR COMMUNICATIONS

TECHNICAL FIELD

Systems and methods for determining a reachability of a specified party are disclosed.

BACKGROUND

In computer and telecommunications networks, presence information (e.g., a presence state) can provide a status indicator that conveys an ability and/or a willingness of a potential communication partner, such as a user and/or a user device, to communicate. A client employed by the user can communicate presence information (e.g., a presence state) via a network connection to a presence service. The presence service can make such presence information available for distribution to other computing devices, such as to inform others of the client's availability and willingness to communicate.

SUMMARY

This disclosure relates to systems and methods for determining a reachability of a specified party.

One example relates to a non-transitory computer readable medium storing machine readable instructions comprising a reachability engine that determines a reachability for a specified party in response to a request for reachability. The reachability can characterize a probability that the specified party will answer a request for communication using a specified mode of communication at a given time. The reachability can be based on status data that characterizes an aggregate of at least two of direct status data, indirect status data and historical status data for the specified party.

Another example relates to a reachability server comprising a memory configured to store machine readable instructions and a processing unit configured to access the memory and execute the machine readable instructions. The machine readable instructions can include a reachability engine that can receive a request for reachability, wherein the request includes a unique identifier of a specified party and determine, in response to the request for reachability, an expected reachability for the specified party as a function of time over a window of time in the future. The expected reachability of the specified party can characterize a probability that the specified party will answer a request for communication using a specified mode of communication. The reachability engine can also provide a response to the request that includes the expected reachability.

Yet another example relates to a method that can include determining, at a reachability server, a reachability of a specified party in response to a request. The reachability can characterize a probability that the specified party will answer a request for communication using a specified mode of communication at a given time and the probability is greater than a threshold level. The method can also include providing, from the reachability server, a response to the request that includes the reachability of the specified party. The method can further include tracking, by the reachability server, actions of the specified party to determine whether the specified party answered a subsequent response for a request for communications using the specified mode of communication.

DETAILED DESCRIPTION

This disclosure relates to systems and methods for determining a reachability of a specified party.

As an example, a reachability server (e.g., one or more computing devices) can calculate a reachability for a specified party in response to a request for reachability provided from a client computing device. The reachability can characterize a probability (likelihood) that the specified party will answer a request for communication using a specified mode of communication at a particular (given) time. The reachability can be based on status data that characterizes an aggregate of direct status data, indirect status data and historical status data for the specified party. This in contrast to existing approaches that use presence information as a way to determine a user's availability. In contrast to reachability, as disclosed herein, such presence information generally indicates the ability to connect with a device that is associated with a given user, regardless of whether the given user is actually available. Additionally, the information considered in determining presence is quite limited, such as reflecting a physical status of the associated device (e.g., is the phone currently on-hook or off-hook).

Moreover, since, in some examples, the reachability server is utilized by a unified communications (UC) system, such that information about the UC system and multiple communication modalities for the specified user is available. As a result, the reachability server can employ analytics on an extensive set of criteria (e.g., the direct status data, indirect status data and historical status data) to determine a user's reachability. For instance, the criteria can include as profile characteristics of the called party (user), different modes of communication, knowledge of the UC configuration for internal numbers, relationship between the parties in the call, current state of the user, device presence, as well as historical data (e.g., CDR/Call history). By leveraging such a rich set of status information, the reachability server can determine reachability for each user more accurately.

The reachability server can provide a response to the request for reachability to the client computing device. The client computing device can output an indication of the reachability of the specified party. In this manner, a user of the client computing device can decide whether to attempt to establish communications with the specified party via one or more particular modes of communication. In some examples, in addition to indicating reachability, the reachability server can specify a best mode of communication for reaching the specified party.

Figure 1:
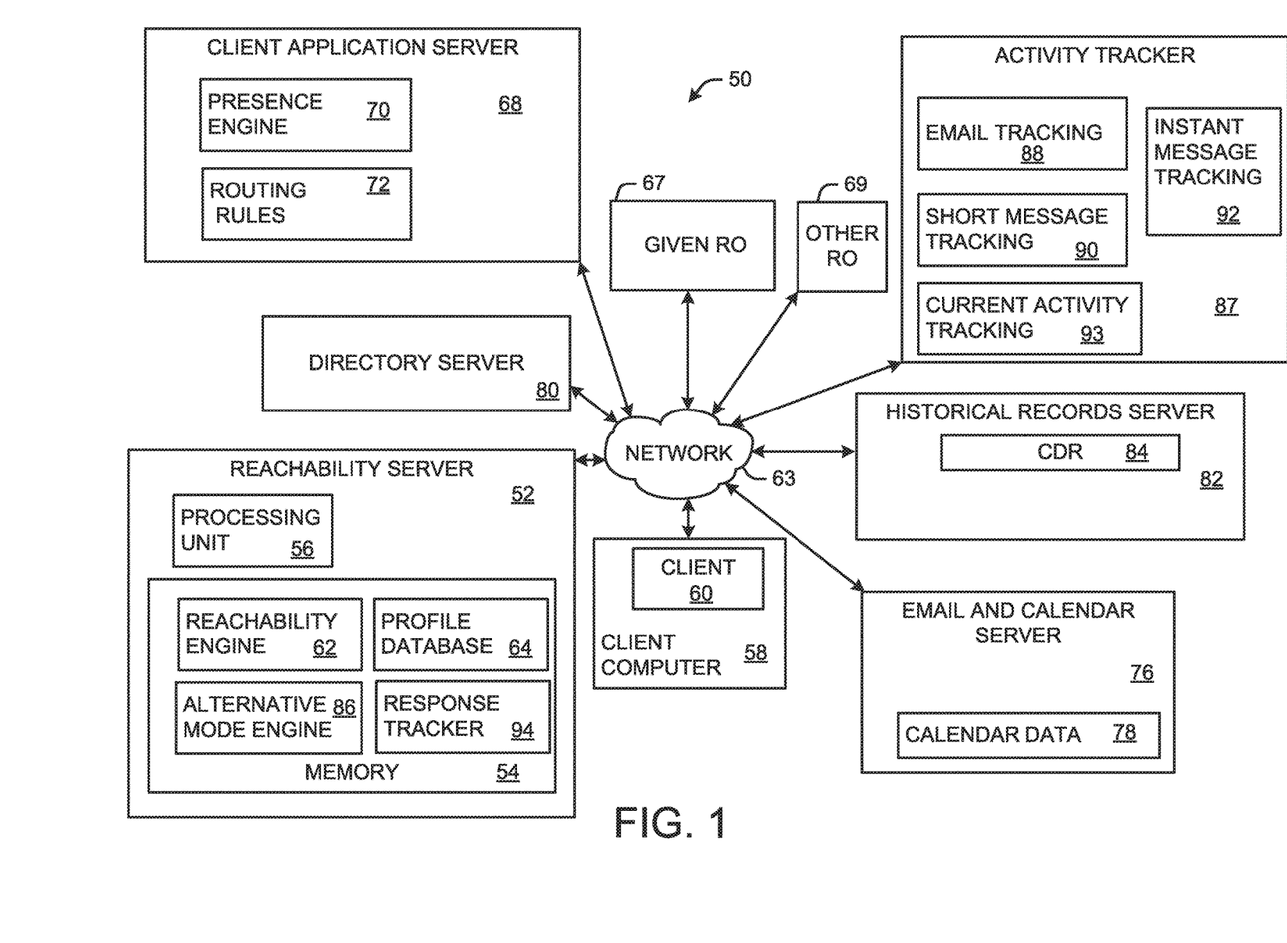
FIG. 1 illustrates an example of a system for determining a reachability of a specified party.

FIG. 1 illustrates an example of a system 50 for calculating a reachability of a specified party. As used herein, the term "reachability" defines a probability or likelihood (e.g., measured as a percentage from 0%-100%) that the specified party (a particular user) will answer a request for communication using a specified mode of communication at a particular time. It is noted that throughout this disclosure, the values, such as the range of 0%-100% are simply examples. In other examples, different ranges between two specified numbers could alternatively be employed to indicate the likelihood.

The system 50 can include a reachability server 52 that can calculate the reachability of the specified party (a user or a plurality of users) in response to a request. The system 50 can be, for example, an enterprise system that can span multiple locations (e.g., offices). Alternatively, the system 50 can be implemented on a single-site system. Components of the system 50 can operate in common network domain, such as a unified communications (UC) system. The UC system can include, for example, virtual and/or physical instances of hardware (e.g., a public branch exchange (PBX), routers, switches, servers, virtual machines, or the like) and software for controlling communications (e.g., voice, text and/or email) between communication endpoints (e.g., desktop phones, softphones, cell phones, and computing devices) within an enterprise that operates under the common network domain. The UC system can be operate as a single or multi-tenant or as a Hybrid unified communication system. In a multi-tenant UC system, each tenant thus can employ an instance of reachability analytics implemented by the system 50 (e.g., within reachability server 52) in which the reachability analytics determines reachability for such users as disclosed herein. Moreover, although components of the system 50 are illustrated and described as operating on specific nodes, it is to be understood that in other examples, components of the system 50 can be configured to operate on other nodes.

The reachability server 52 can be implemented, for example in a distributed computing system (e.g., a computing cloud) or as a stand-alone computing device. The reachability server 52 can include a memory 54 that stores machine readable instructions. The memory 54 can be implemented, for example, as volatile memory (e.g., random access memory (RAM)) non-volatile memory (e.g., a hard disk drive, a solid state drive, flash memory, etc.) or a combination thereof. The reachability server 52 can include a processing unit 56 (e.g., one or more processor cores) that can access the memory 54 and execute the machine readable instructions.

The system 50 can include a client computer 58 that executes a client application 60. The client computer 58 can be implemented, for example, as a desktop computer, a laptop computer, a tablet computer, a handheld computer (e.g., a smartphone or a personal digital assistant) or embedded in another device (e.g., a device mounted to a wall or a desk phone). The client application 60 can be a standalone application. Alternatively, the client application 60 can be implemented in a web portal or web interface and/or as a plugin for another application, such as a cloud computing service, including a SALESFORCE.COM® (SFDC) cloud computing service. The client application 60 can provide a graphical user interface (GUI) for interfacing with a user of the system 50. In some examples, the client 60 can be a stand-alone application. In other examples, the client 60 can be integrated (e.g., as a module or plugin) with another application, such as an electronic dialing directory, a softphone, or the like.

In one example, the client 60 can communicate with a reachability engine 62, which is stored in the memory 54, via a network 63 to request the reachability of a specified party. The network 63 can be, for example, a public network (e.g., the Internet), a private network (e.g., a local area network) or a combination thereof (e.g., a virtual private network). In some examples, the request for reachability can be generated by the client 60, for example, in response to an attempt to request voice communications (e.g., a phone call, video conferencing, etc.) with the specified party. Additionally or alternatively, the request for reachability can be generated in response to a particular user input. The request for reachability can include, for example, a unique identifier of the specified party (e.g., a name, a phone number or extension, an Internet Protocol (IP) address, a media access control (MAC) address, etc.). The request for reachability can also include a unique identifier of a respective user associated with (e.g., assigned to) the client computer 58, which user can be referred to a requesting party. Thus, in some examples, the request can include an identifier for the specified party and the requesting party as to enable the reachability server 52 to determine the reachability for the specified party and send the indication to the requesting party.

In response to the request for reachability, the reachability engine 62 can access a profile database 64 (or other data structure) and retrieve a profile record (e.g., a database record) associated with the specified party identified in the request for reachability, as well as a profile record associated with the requesting party. In some examples, the profile record of the specified party can include a predetermined (e.g., prior calculated) reachability of the specified party and/or weight factors for the reachability of the specified party. The reachability of the specified party can be calculated by the reachability engine 62 based on data gathered in a manner described herein.

As further example, the reachability engine 62 can collect (e.g., retrieve) status data from a plurality of sources (e.g., indicators) via the network 63 and aggregate the data to calculate (or update) the reachability of the specified party. In some examples, the status data can include direct status data provided from direct indicators, indirect status data provided from indirect indicators, historical status data provided from historical indicators. In some examples, upon collecting sufficient status data from the various indicators, the reachability engine 62 can employ Equation 1 to determine the reachability for the specified party.

$$R_{id} = \text{Max}[\text{Min}(100 - \text{StatusData}_w, 100), 0] \qquad \text{Equation 1}$$

Wherein:
id is a unique identifier of the specified party (e.g., a username);
$R_{id}$ is the reachability (in percent) of the specified party;
StatusData$_w$ is a weighted characterization of the status data for the specified party and StatusData$_w$ is defined by Equation 2; and
100−StatusData$_w$ can be a positive or negative value.

$$\text{StatusData}_w = (\text{DirectStatusData} + \text{IndirectStatusData} + \text{HistoricalStatusData}) * 100 \qquad \text{Equation 2}$$

It is noted that the equations described in this disclosure are examples of one way that specific values can be calculated. In other examples, different equations and/or different values can be employed.

As mentioned, the reachability engine 62 can collect a portion of the status data from a direct indicator that can characterize a presence state for the specified party. The presence state of the specified party characterizes real-time or near real-time ability and/or a willingness of the specified party to employ a given resource object (RO) 67 (e.g., a communication endpoint) and communicate with another communication endpoint (e.g., another party, including the requesting party).

The given RO 67 can be a communication device, such as a desktop phone, a smartphone or a softphone (e.g., an application executing on a computing device) that is assigned to the specified party. In some examples, such as in UC systems, the specified party may be assigned multiple ROs, namely, the given RO 67 and another RO 69. For instance, the specified party may be assigned a desktop (office) phone (the given RO 67) and a smartphone (the other RO 69). In other examples, different types of ROs could be assigned to the specified party. The presence state for the specified party can represent an aggregate of all presence states of the individual ROs 67 and 69 (and any other additional ROs) assigned to the specified party.

The reachability engine 62 can query a client application server (CAS) 68 and/or other telecommunication server for the presence state of the specified party. For example, the CAS 68 can employ a presence engine 70 that monitors communication (directly or indirectly) with the given RO 67 and the other RO 69 assigned to the specified party to determine the presence state of the specified party. Table 1 lists examples of possible presence states for the specified party assigned to the given RO 67 and the other RO 69. The list of presence states in Table 1 is not meant to be exhaustive. Instead, the list of presence states in Table 1 lists some possible examples of presence states that could be calculated by the presence engine 70. The type of presence state further can vary depending on the type and configuration of the RO 67. The CAS 68 can return the presence state to the reachability engine 62 in response to the request for the presence state of the specified party.

TABLE 1

| Uknown | Online | Returned Call |
|---|---|---|
| Offline | Away | Ringing Workgroup |
| Rining Call | Idle | Parked Worgroup Call |
| Parked Call | Busy | Held Workgroup Call |
| Held Call | Be Right Back | Connected Workgroup Call |
| On the Phone | Out to Lunch | Call being Recored |
| Do Not Distrub (DND) | Custom | |
| Non-Standard Call Handling | Connected Call | |

Some of the presence states listed in Table 1 could be triggered by schedules setup by the specified party. For instance, the specified party may set parameters that cause the CAS 68 to automatically set the presence state of the specified party as "Out to Lunch" at 12:00 p.m. (noon) every Monday, Wednesday and Friday. Such a schedule can be factored in by the reachability engine 62 in the determination of the reachability of the specified party.

The reachability engine 62 can process the presence state of the specified party to determine if further gathering of data is warranted to calculate the reachability of the specified party, $R_{id}$. In many situations, the presence state of the specified party independently can indicate that the specified party is unreachable, such that the reachability is 0% (or near 0%). For instance, if the presence state of the specified party indicates that the specified party is on a call (e.g., a presence state of "on the phone", "ringing call", "held call", "connected to workgroup call", etc.) or otherwise indicates that the specified party does not wish to be contacted (e.g., a presence state of "do not disturb", "out to lunch", "away", "busy", etc.), the reachability engine 62 can determine there is no chance (or very little chance) that the specified party can be reached at the current time. Accordingly, in this situation, the reachability engine 62 can set a reachability of the specified party to unreachable (about 0%). For example, the reachability engine 62 can employ Equation 3 select and a value for DirectStatusData$_{Pres}$, wherein DirectStatusData$_{Pres}$ characterizes the reachability of the specified party contributed by the direct status data. In some examples, selecting a value of '1' for the DirectStatusData$_{Pres}$ can indicate that the presence state of the specified party indicates that the specified party is on a call or does not wish to be contacted. If the presence state indicates another status for the specified party (e.g., "idle"), DirectStatusData$_{Pres}$ can be set to '0'.

$$\text{DirectStatusData}_{Pres} \in \{0,1\} \quad \text{Equation 3}$$

As is characterized by Equation 1 and Equation 2 (and by Equation 5 described below), setting DirectStatusData$_{Pres}$ to '1' causes $R_{id}$ to be set to unreachable (0%). In some such occurrences, the reachability engine 62 can return an indication of reachability (being unreachable) of the specified party to the client computer 58 based on the presence state data. In other examples, even where presence state indicates that the specified party is unavailable currently via one RO (e.g., via telephone involved in a conference call), the reachability engine 62 can continue analyzing other status data, such as disclosed herein, to ascertain reachability via one or more other alternative ROs (e.g., email client, instant messaging client or the like) concurrently assigned to the specified party. Reachability further can vary according to a relationship known a priori between the requesting party and the specified party. For example, the relationship can be stored as or derived from personnel data (e.g., indicating a relationship among employees) or customer relationship management (CRM) data (e.g., indicating a relationship with customers).

Alternatively, if the presence state of the specified party indicates that the specified party is available via one or more associated ROs (e.g., presence state of "idle", "online", etc.), (such that DirectStatusData$_{Pres}$ is set to '0') the reachability engine 62 can query the CAS 68 for routing rules 72 of the specified party. In response, the CAS 68 can access routing rules data (e.g., stored in a database) to retrieve routing rules 72 assigned to the specified party. The routing rules 72 for the specified party can be, for example, a set of policies for routing calls to the given RO 67 and the other RO 69 of the specified party. For instance, the routing rules 72 can define a time during a day that a simultaneous ring (e.g., "simul-ring" or "find me") is configured. Simultaneous ring can cause the given RO 67 and the other RO 69 (which are each assigned to the specified party) to ring simultaneously in response to a request for voice communication (e.g., a telephone call). For instance, if the given RO 67 is a desktop phone and the other RO 69 is a smartphone, the simultaneous ring feature of the routing rules 72 for the specified party can cause both the given RO 67 and the other RO 69 to ring simultaneously. In a similar manner, the routing rules 72 for the specified user can define a time for a sequential ring (e.g., "follow me"). Sequential ring can cause the given RO 67 to ring first and the other RO 69 to ring after the given RO 67 rings a predetermined number of times.

The reachability engine 62 can evaluate the routing rules 72 stored for the specified party (which routing rules 72 include governing rules/user preferences for calls routed to the given RO 67 and the other RO 69) to determine the reachability of the specified party contributed by the routing rules 72. In some instances, such as situations where the given RO 67 is offline (e.g., due to a power loss) and the other RO 69 is not assigned to the specified party, the reachability engine 62 can determine the reachability of the specified party to be unreachable (e.g., about 0%). Similarly, the reachability engine 62 can set the reachability of the specified party to unreachable (e.g., about 0%) in situations where the routing rules 72 suggest the specified party is blocking reachability (e.g., the routing rules 72 set the given RO 67 to "do not disturb"). Additionally, in situations where multiple ROs, including the given RO 67 and the other RO 69 (and/or additional ROs), are assigned to the specified party, the reachability engine 62 can assign a union probability to both the given RO 67 and the other RO 69 to determine the reachability of the specified party. As one example, the DirectStatusData$_{Rules}$ (the DirectStatusData contributed by the routing rule 72) can be set by the reachability engine 62 based on Equation 4 and a complete value for DirectStatusData can be calculated with Equation 5.

$$\text{DirectStatusData}_{Rules} \in \{0,1\} \quad \text{Equation 4}$$

$$\text{DirectStatusData} = \text{DirectStatusData}_{Pres} \cup \text{DirectStatusData}_{Rules} \quad \text{Equation 5}$$

In particular, the DirectStatusData$_{Rules}$ can be set to '1' by the reachability engine 62 if the routing rules 72 indicate that the specified party is blocking reachability and/or there is no communication with the RO 67 assigned to the specified party. Moreover, as indicated by Equations 1-5, setting DirectStatusData$_{Rules}$ to '1' causes R$_{id}$ to be set to unreachable (0%). In such occurrences, in some examples, the reachability engine 62 can return a reachability (of unreachable) of the specified party to the client computer 58.

It is noted that in some situations, the profile record of the specified party can include rules for "overriding" the setting of the reachability based on a value set for DirectStatusData$_{Pres}$ and/or the DirectStatusData$_{Rules}$. For instance, if the profile record for the specified party indicates a history of the specified party repeatedly answering requests for communication from the requesting party at particular times (e.g., time and day of the week or month) correlating to a time the request for reachability is sent (e.g., a current time), even in situations where the DirectStatusData$_{Pres}$ and/or the DirectStatusData$_{Rules}$ indicates that the specified party is unreachable such data can cause the reachability engine 62 to discard (or reduce reliance on) the value of DirectStatusData and continue to collect/retrieve status data. In this manner, data (e.g., historical data) stored in the profile record can be leveraged to determine the reachability of the specified party.

In situations where reachability engine determines that the specified party is not unreachable (e.g., the reachability is greater than 0%), the reachability engine 62 can collect status data from one or more indirect indicators. For example, the reachability engine 62 can query an email and calendar server 76 (e.g., a MICROSOFT EXCHANGE® server, a Linux Zentayal server, etc.) for calendar data 78 for the specified party. The email and calendar server 76 can return the calendar data 78 to the reachability engine 62 that characterizes a calendar configured by or on behalf of the specified party.

In response, the reachability engine 62 can examine the calendar data 78 (indirect status data) for the specified party to determine if the specified party has a calendar event (e.g., a meeting or a conference call) scheduled for the current time of the client request. If the calendar data 78 indicates that the specified party has scheduled a calendar event at or near a current time, such as a meeting or a conference call that does not include the requesting party, the reachability engine 62 can set the reachability of the specified party to unreachable (e.g., about 0%) or a corresponding low likelihood value. However, if the specified party has scheduled a calendar event at or near a current time such as a meeting or a conference call that includes the requesting party (e.g., the specified party and the requesting party are both conference participants), the reachability would be greater than 0%. For example, it would be more likely that the specified party would answer a call from a requesting party when a meeting is upcoming with the requesting party. If there is no calendar event scheduled or a current calendar event indicates that the specified party is available for calls, the reachability engine 62 can store the calendar data 78 as part of the indirect status data of the status data for the specified party in the profile record of the prolife database 64 that is assigned to the specified party. For example, the reachability engine 62 can employ Equation 6 to determine a value for IndirectStatusData.

$$\text{IndirectStatusData} = \text{IndirectStatusData}_{Cal} + \text{IndirectStatusData}_{Profile} + \text{IndirectStatusData}_{Wireless} \quad \text{Equation 6}$$

Wherein:

IndirectStatusData characterizes a portion of the reachability of the specified party that is contributed by the indirect status data and is defined by Equation 7;

IndirectStatusData$_{Cal}$ characterizes a portion of the IndirectStatusData that is based on calendar events;

IndirectStatusData$_{Profile}$ characterizes a portion of the IndirectStatusData that is based on profile data; and IndirectStatusData$_{Wireless}$ characterizes a portion of the IndirectStatusData that is based on wireless data.

$$\text{IndirectStatusData}_{Cal} \in (0,1) \quad \text{Equation 7}$$

In particular, the IndirectStatusData$_{Cal}$ can be set to '1' by the reachability engine 62 if the calendar data 78 indicates that the specified party is in a meeting (or has an upcoming meeting) that does not include the requesting party. Conversely, IndirectStatusData$_{Cal}$ can be set to a positive, decimal value between '0' and '1' if the calendar data 78 indicates that both the specified party and the requesting party are attending a current or upcoming meeting. For instance, the temporal proximity of the meeting can be used to reduce the decimal value of IndirectStatusData$_{Cal}$ accordingly.

Additionally or alternatively, the reachability engine 62 can query external public sources (e.g., search engines), the email and calendar server 76 and/or a directory server (e.g., an Active Directory Server) 80 for portions of profile data of the specified party that can be additional indirect status data. The profile data from the server 80 can include, for example, user account information for accessing computing resources of the domain. In particular, the reachability engine 62 can query the additional sources for profile information for the specified party that indicates the specified party's job title, area of expertise, department, role, personal preferences, etc. The additional indirect data can be stored in the profile record of the profile database 64 that is assigned to the specified party. Additionally, the reachability engine 62 can query the profile database 64 to extract a (predetermined) reachability of another user with similar indirect data (e.g., the same job title, the same department, etc.). The reachability engine 62 can employ statistical modeling, such as a "bag-of-words" model and/or analytical recognition to determine an average probability of reachability for the profile data. The average probability can be multiplied by a weight factor. The weight factor can be stored in the profile record associated with the specified party. The weigh factor applied can be positive or negative and/or be fractional or integer weighting. For example, the reachability engine 62 can employ Equation 8 to determine a value for IndirectStatusData$_{Profile}$.

$$\text{IndirectStatusData}_{Profile} = \text{ProfileProb} * W_{Profile} \quad \text{Equation 8}$$

Wherein:

ProfileProb is the average probability selected from the interval of (0,1) of reachability determined from the profile data; and $W_{Profile}$ is the weight factor of the ProfileProb.

Additionally or alternatively, the reachability engine 62 can query the CAS 68, the given RO 68 and/or the other RO 69 for detected wireless devices (which can be referred to as wireless data) that can be additional indirect status data. Similarly, the reachability engine 62 can query another wireless device (e.g., a Bluetooth beacon), such as a location tracker that is (physically) located near a possible location of the specified party, which other wireless device can be yet another RO assigned to the specified party. In some situations, the given RO 67 and/or the other RO 69 (each associated with the specified party) can be equipped with a wireless transceiver, such as a Bluetooth transceiver, (e.g., a Bluetooth Low Energy (BLE) or other Bluetooth device), a WiFi transceiver or the like. Additionally or alternatively, the other wireless device may be a stand-alone wireless device or embedded in the given RO 67 or the other RO 69. In any of these situations, the CAS 68, the given RO 68, the other wireless device and/or the other RO 69 can provide a list of wireless devices (e.g., a list of network names and/or addresses) that are being detected. By leveraging knowledge of the detected wireless devices the location of the specified party may be able to be predicted.

In one example, it is presumed that the given RO 67 represents a desk phone of the specified party and the other RO 69 represents a mobile phone of the specified party. In this situation, if the given RO 67 detects the presence of the other RO 69, or vice versa, there is an increased chance that the specified party is located at or near the given RO 67 (the desktop phone), which can indicate an increase in the reachability of the specified party. Conversely, if the given RO 67 and the other RO 69 do not detect each other there is an increased chance that the specified party is away from a desk assigned to the specified party, which can indicate a decrease in the reachability of the specified party. The reachability engine 62 can set IndirectStatusData$_{Wireless}$ to a decimal between '0' and '1' (or at '0' or '1') to reflect the detection (or lack thereof) of the other RO 69 by the given RO 67 (or vice versa). Additionally, IndirectStatus-Data$_{Wireless}$ can also include a wireless weight factor that may be changed over time by the reachability engine 62 that can be stored in the profile record of the specified party.

It is to be understood that the instances of the given RO 67 being a desk phone, the other RO 69 being a mobile phone and/or the other wireless device being a Bluetooth beacon are simply possible examples. In other examples, the given RO 67 may be a softphone and the other wireless device could represent a wireless transceiver (e.g., a network card or a dongle) integrated with the given RO 67. Additionally, the given RO 67, the other RO 69 and/or the other wireless device are not limited to any particular wireless protocol. That is, although the examples include a description of employing Bluetooth and WiFi, other protocols, such as ZigBee could be employed as well.

Further, as noted, the status data can include historical status data. To collect the historical status data, the reachability engine 62 can query an historical records server 82 for the historical status data such as a call detail record (CDR) 84 for the specified party. The CDR 84 for the specified party can include a list of calls or other communication transactions and associated attributes (e.g., incoming outgoing and duration, completion, source number, and destination number) to the given RO 67 and the other RO 69 (and any additional ROs) assigned to the specified party. The reachability engine 62 can examine the CDR 84 for the specified party to determine a reachability based on the specified party's past tendencies to answer requests for voice communications (e.g., phone calls) at or near a current time of day for one or more communications modality, namely RO 67 and/or RO 69. Additionally, the reachability engine 62 can consider the identity of the requesting party. For instance, if the CDR 84 for the specified party indicates that the specified party has a history of answering (or not answering) calls from the requesting party, the reachability can be increased (or decreased) accordingly.

Additionally, the reachability engine 62 can apply a weight factor to compute the reachability based on the historical status data. The weight factor for the historical status data can be based on a sample size (e.g., a number of tracked communication sessions) of the CDR 84 for the specified party as well as a weight factor stored in the profile database 64 associated with the specified party. The weigh factor applied can be positive or negative and/or be fractional or integer weighting. For instance, if the sample size in the CDR 84 meets a threshold (e.g., 10 or more communication sessions), the weight factor can be increased. Moreover, in some examples, the reachability engine 62 can query the directory server 80 (or another source) to extract information about the specified party and the requesting party. The reachability engine 62 can employ machine learning techniques (e.g., linear regression, classification, clustering, etc.) on the extracted information to determine if any pre-existing relationship (e.g., supervisor/employee, team member, a personal contact or the like) increases or decreases the likelihood that the specified party would answer a request for communications from the requesting party at the current time. Based on the determined pre-existing relationship, the weight factor for the historical data can be increased or decreased accordingly.

For example, the reachability engine 62 can employ Equation 9 to determine a value for HistoricalStatusData.

$$\text{HistoricalStatusData} = \text{HistProb} * W_{Hist} \qquad \text{Equation 9}$$

Wherein:

HistoricalStatusData is the reachability of the specified party contributed by the historical status data;

HistProb is the determined historical probability (within the interval of (0,1)) based on the historical data (the CDR 84) for the specified party; and $W_{Hist}$ is the weight factor for the historical probability.

In some examples, the weight factor for the historical probability, $W_{Hist}$ (or other term) can have an exponential time decay factor. Additionally, in many examples, the value for HistoricalStatusData is based on the relationship between the specified party and the contacting party.

By employing these techniques, including any combination of Equations 1-9, the reachability engine 62 can determine (estimate) the reachability of the specified party for the requesting party. Moreover, the reachability engine 62 can store the status data (or some portion thereof) along with the determined reachability for the specified party in the profile record associated with the specified party.

In a similar manner, the reachability engine 62 can determine (estimate) an expected reachability for the specified party at a time other than a current time (e.g., a time that the requesting party requests contact with the specified party). For example, by employing similar techniques as those described above, the reachability engine 62 can calculate the expected reachability of the specified party as a function of time. For instance, the reachability engine 62 can ascertain an indication of an expected reachability for the specified party at a multiple times in the future. That is, the reachability engine 62 can determine the expected reachability of the specified party for a window of time in the future. Moreover, in some situations, the reachability engine 62 can determine a sub-window of time (in the window of time in the future) that the expected reachability of the specified user is at a highest level. It is noted that in such a situation, some factors, such as a presence state of the specified party would be unknown for the future. However, in such a situation, the expected reachability is based on known (or predictable) factors that the reachability engine 62 employs to calculate the expected reachability of the specified party as a function of time.

Additionally, in some examples, if the reachability engine 62 determines that the reachability of the specified party is below a reachability threshold (e.g., 20%), the reachability engine 62 can query an alternative mode engine 86 stored in the memory 54 for a suggested alternative mode of communication with the specified party, which may be for the current time in response to a request or at future time indicated in the request.

The alternative mode engine 86 can query an activity tracker 88 (e.g., a server) for data such as email tracking data 88, short message tracking data 90 and instant message tracking data 92 and current activity tracking data 93. The email tracking data 88 can characterize a number of emails generated by the specified party over a given period of time (e.g., 1 month) as well as a time that each email was sent. The short message tracking data 90 can characterize a number of short messages (e.g., text messages such as messages sent via a short messaging service (SMS)) sent by the specified party in the given period of time as well a time that each short message was sent. Similarly, the instant message tracking data 92 can characterize a number of instant messages (IMs) sent by the specified party during the given period of time as well as a time that each IM was sent. Further, the current activity tracking data 93 can characterize the specified party's current activity. For instance, the current activity tracking data 93 can indicate if the specified party is currently preparing and/or sending an email, an IM or a short message. Additionally, the current activity tracking data 93 can indicate that the specified party has just repeatedly sent emails, short messages or IMs.

The alternate mode engine 86 can analyze the email tracking data 88, the short messaging tracking data 90, the instant message tracking data 92 and the current activity tracking data 93 to determine the suggested alternate mode of communication for the specified party 62 based on a number of factors. The suggested alternate mode (of communication) can have a highest determined probability of the specified party responding at the current time. For instance, if the specified party has written many more emails than short messages and/or IMs particularly at a time of day near the current time (e.g., Tuesdays at 10:00 a.m.), the alternate mode engine 86 can set the suggested alternate mode to email. Furthermore, if the current activity tracking data 93 indicates that the specified party is currently employing a particular mode of communication (e.g., the specified party is preparing and/or sending an email, an IM or a short message), the alternate mode engine 86 can set the suggested alternate mode to the mode of communication currently being employed by the specified party. Similarly, if the current activity tracking data 93 indicates that the specified party has just sent multiple messages (e.g., emails, short messages or IMs) using a specific mode of communication, the alternate mode engine 86 can set the suggested alternate mode of communication to this mode of communication that has just been repeatedly employed. Moreover, if multiple modes (e.g., email and short messages) have equal (or nearly) equal probabilities of reachability, a single alternate mode can be selected based on predetermined settings (e.g., preferences of the specified party). The alternate mode engine 86 can return the suggested alternate mode of communication to the reachability engine 62.

The reachability engine 62 can return the determined reachability for the specified party to the client 60 of the client computer 58 employed by the requesting party. Similarly, the reachability engine 62 can return the expected reachability of the specified party as a function of time to the client. Additionally, in some situations, the reachability engine 62 can provide a suggested mode of communication, which can be voice communications or the suggested alternate mode of communication for the specified party to the client 60. The suggested mode of communication can also be stored in the profile database 64 in the profile record associated with the specified party. Thus, in some examples, the reachability engine 62 can use the information from the alternative mode engine 68 to determine a time (or time window) as well as a mode of communications having an increased likelihood value (e.g., the greatest likelihood or a likelihood value that exceeds a threshold) for expected reachability for the specified party.

The client 60 can output information to the requesting party that characterizes the determined reachability of the specified party, as well as a suggested best mode of communication (e.g., either voice communication or the suggested alternate mode of communication) to reach the specified party. Where the likelihood of reachability is about 0% or below a prescribed threshold for a selected mode of communications, the reachability server 52 can also indicate a future time (or time window) and mode of communications having an increased likelihood value for expected reachability of the specified party. In addition to outputting the reachability information, in some examples such as where the client and specified party are part of the same UC system, the client 60 can use the reachability information to control when to initiate the communication and/or which mode of communication to utilize to contact the specified party. As another example, the reachability server 52 can provide updates to the client 60 to indicate the reachability for the specified party. When the actual reachability for the specified party exceeds a threshold (e.g., a fixed or user programmable threshold), the client 60 can initiate communication with the specified party via a selected mode of communication. The determination that the reachability exceeds the threshold can be made at the reachability server 52 or the client 60.

A response tracker 94 stored in the memory 54 can monitor the specified party's response to a subsequent attempt to establish communication (e.g., a phone call, a IM, an email or a short message) with the specified party. For instance, the response tracker 94 can communicate with the CAS 68 and/or the activity tracker 87 to determine (i) if the specified party responded to the request to establish communication and (ii) the mode of communication employed by the specified party. The response tracker 94 can update the record in the profile database 64 and adjust weights factors for reachability associated with the specified party (e.g., $W_{Profile}$ and $W_{Hist}$) as feedback thereby forming a "learning loop". Thus, over time, multiple requests by the requesting party (or another party) using a particular mode of communication can improve the accuracy of the determined reachability.

It is noted that the reachability server 52 can be employed in many different environments. For example, the reachability server 52 can be employed to provide the requesting party with the reachability of the specified party in the manner described herein. As an alternative example, the reachability server 52 can be employed in a contact center (call center) environment. In such a situation, a call may be routed to a user with a highest predetermined reachability. Thus, the reachability engine 52 can compute reachability for a group of users (e.g., a hunt group or other group, such as at the call center) and leverage the computed reachability values to control routing of incoming calls to users within the contact center.

By employing the system 50, the reachability of users can be determined/estimated based on (i) a current presence status of each user (ii) preferences of the users, (iii) a schedule (e.g., calendar events) of each user, (iv) relationships between the users and (v) historical data characterizing past actions of the users. In this manner, multiple factors (variables) can be considered, such that a requesting party has an increased chance of reaching a specified party.

Figure 2:
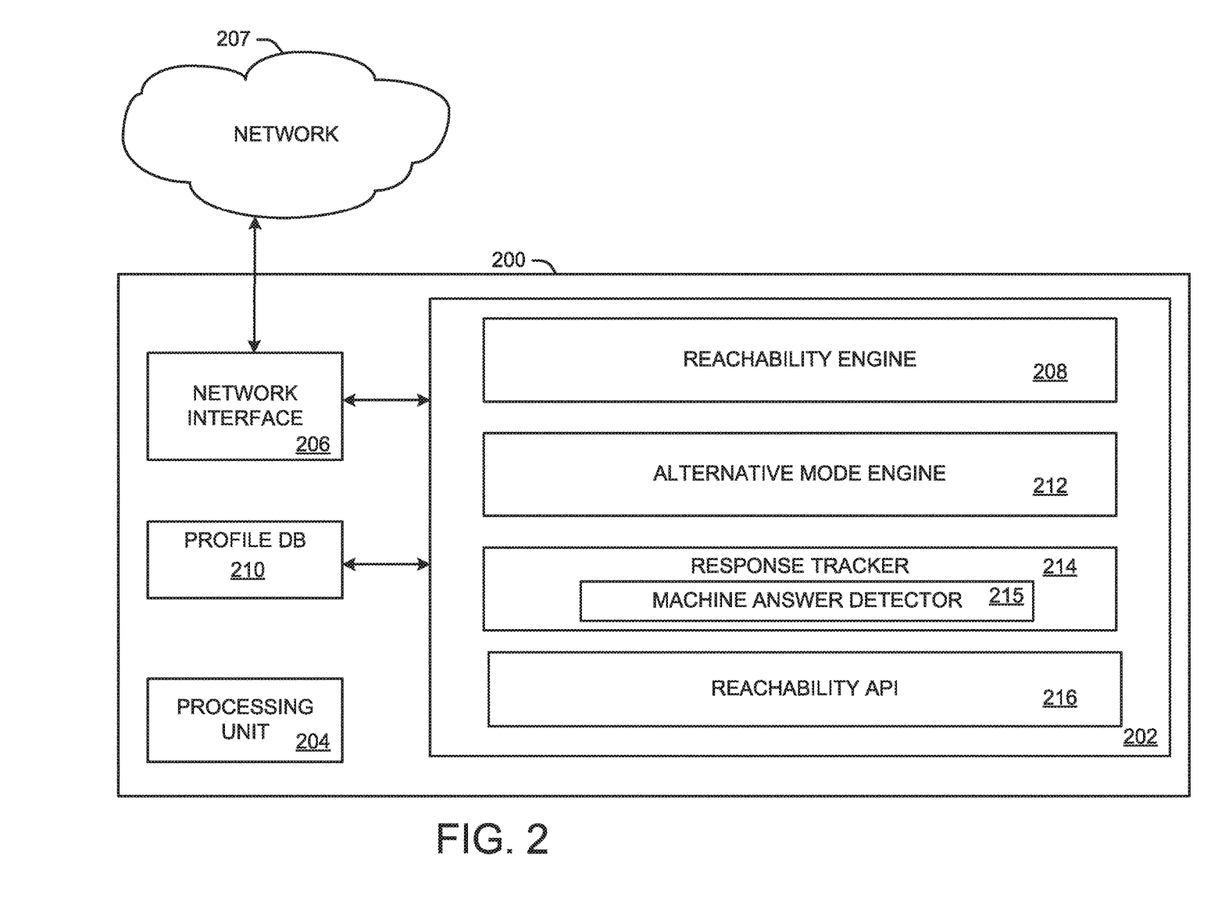
FIG. 2 illustrates an example of a reachability server.

FIG. 2 illustrates an example of a reachability server 200 that could be employed, for example to implement a reachability server 52 illustrated in FIG. 1. The reachability server 200 can include, for example, a memory 202 that can store machine readable instructions. The memory 202 could be implemented, for example, as a non-transitory computer readable medium, such as volatile memory, nonvolatile memory or a combination thereof, which may be local or distributed (e.g., in a cloud or storage area network). The reachability server 200 can also include a processing unit 204 to access the memory 202 and execute the machine-readable instructions. The processing unit 204 can include, for example, a processor core. The reachability server 200 can include a network interface 206 (e.g., a network card) configured to communicate with a network 207, such as a public network (e.g., the Internet), a private network (e.g., a dedicated connection, such as including a UC system) or combination thereof.

The reachability server 200 can be implemented in a cloud computing environment, such that the components of the reachability server 200 can be virtual hardware components. In such a situation, features of the reachability server 200, such as the processing unit 204, the network interface 206, and the memory 202 could be representative of a single instance of hardware or multiple instances of hardware with applications executing across the multiple of instances (i.e., distributed) of hardware (e.g., computers, routers, memory, processors, or a combination thereof). Alternatively, the reachability server 200 could be implemented on a single dedicated server. Moreover, the reachability server 200 can be integrated with another server, such as an analytics server or a telecommunications server.

The memory 202 can include a reachability engine 208 programmed to receive and process requests for the reachability of users. In a first example (hereinafter, "the first example"), the reachability server 200 can respond to requests for the reachability of a specified party (e.g., a contacted party, such as a user registered for operating one or more communication modalities within a UC system the utilizes the reachability server 200).

The reachability engine 208 can process and respond to the requests for the reachability of the specified party. In the first example, the request includes a unique identifier (e.g., a name, a username, a network address, phone number, etc.) assigned to the specified party and a unique identifier of a requesting party (e.g., another name, username, network address, phone number, etc.). In response to the request, the reachability engine 208 can retrieve a profile record from a profile database 210 for the specified party and the requesting party.

The profile record for the specified party can include weight factors that can be applied to parameters for calculating the reachability of the specified party. For instance, as explained with respect to FIG. 1, the profile record of the specified party can include an initial weight factor of a profile probability, $W_{Profile}$ and/or a historical probability, $W_{Hist}$.

Additionally, in the first example, the reachability engine 208 can query network nodes for various forms of status data regarding the specified party. As explained with respect to Equations 1-2, the status data can be employed to calculate a weighted status data, $StatusData_w$ that can be employed to determine the reachability, $R_{id}$ for the specified party.

In some examples, the profile record of the specified party can include data indicating that the specified party is configured as a "machine extension" (e.g., an automated response generator) set to (permanently) provide an automated response. For instance, the profile record could indicate that the specified party is a general voicemail account that is immediately directed to voicemail at all times. In such a situation, the reachability engine 208 can set the reachability, $R_{id}$ of the specified party to 100% (or at least above a threshold), since it may be presumed that the voicemail will answer a request for voice communications. Additionally, in some example, the profile record of the specified party can indicate that the specified party corresponds to (e.g., assigned to) a "ring group" that simultaneously or sequentially attempts to establish communication with multiple parties (users). In this situation, the reachability engine 208 can calculate the reachability of each party (in the manner described herein) in the ring group and perform a union function to determine a combined reachability, which combined reachability can be the reachability $R_{id}$ for the ring group (the specified party).

For instance, to collect direct status data (of the status data), the reachability engine can query a CAS (e.g., the CAS 68 of FIG. 1) for a presence state and routing rules of the specified party. Upon receiving the presence state for the specified party, the reachability engine 208 can examine the presence state (characterized in Table 1) of the specified party to determine if the specified party is unreachable (e.g., the specified party is currently using an RO for voice communications). If the presence state indicates that the specified party is unreachable, the reachability engine 208 can employ Equation 3 to set a $DirectStatusData_{Pres}$ of the $StatusData_w$ to '1' such that (by Equation 1), the reachability of the specified party is set to unreachable (e.g., about 0%). Alternatively, if the presence state indicates that the specified party is available the $DirectStatusData_{Pres}$ of Equation 3 can be set to '0'.

If the presence state indicates that the specified party is available (e.g., one or more ROs assigned to the user has a presence state of "idle"), the reachability engine 208 can examine the routing rules of the specified party to determine if the specified party has set (or will set in the future) an RO assigned to the specified party to a state that blocks reachability (e.g., the routing rules set an RO assigned to a specified party to "do not disturb"). In such a situation, by employing Equation 4 and Equation 5 the reachability engine 208 can set the $DirectStatusData_{Rules}$ (and the DirectStatusData) to '1' such that (by Equation 1), the reachability of the specified party is set to unreachable (e.g., about 0%).

Alternatively, if the routing rules indicates that the specified party is available, the DirectStatusData$_{Rules}$ can be set to '0'.

If the DirectStatusData is '0', the reachability engine 208 can continue to collect status data. The reachability engine 208 can collect indirect status data of the status data to determine the reachability of the specified party based on the indirect status data, IndirectStatusData, as characterized in Equation 6. For example, the reachability engine 208 can collect indirect status data, namely calendar data from an indirect data source, such as an email and calendar server (e.g., the email and calendar server 76 of FIG. 1). The reachability engine 208 can examine the calendar data to determine a portion of the IndirectStatusData that is based on future calendar events, IndirectStatusData$_{Cal}$.

For instance, as explained with respect to Equation 6, if the calendar data indicates that the specified party has an upcoming meeting (a calendar event) that does not include the requesting party, the reachability engine 208 can set IndirectStatusData$_{Cal}$ to '1'. Conversely, if the calendar data indicates that the user has an upcoming meeting (e.g., a calendar event) that does include the requesting party, IndirectStatusData$_{Cal}$ can be set to a decimal value between '0' and '1'.

Additionally, the reachability engine 62 can query external public sources (e.g., search engines), the email and calendar server and/or a directory server (e.g., the directory server 80) for portions of the indirect data that characterize profile data (e.g., a job title, a role, an area of expertise and/or relationships) for the specified party. The profile data can be employed to calculate the reachability contributed by the profile data, IndirectStatusData$_{Profile}$. In some examples, the profile data may be stored in the profile record for the specified party. The reachability engine 208 can employ statistical modeling to determine an average probability of reachability of the specified party, ProfileProb. Additionally, a weight factor (extracted from the profile record of the specified party), W$_{Profile}$ can be applied to (e.g., multiplied by) ProfileProb to determine IndirectStatusData$_{Profile}$, such as explained with respect to Equation 8.

Additionally or alternatively, the reachability engine 208 can query the CAS, each RO assigned to the specified user and/or another wireless device (e.g., a Bluetooth beacon) for a list of detected wireless devices that can collectively be referred to as wireless data (additional indirect status data). The other wireless device can also be considered an RO assigned to the specified party. The ROs assigned to the specified party can be, for example, desk phones, softphones, wireless beacons (e.g., Bluetooth beacons), stand-alone wireless devices, integrated wireless devices or the like. Additionally, nearly any wireless protocol can be employed, such as but not limited to Bluetooth, WiFi and ZigBee.

As one non-limiting example, the specified party can be assigned a desk phone and a mobile phone. In such a situation, the CAS, the desk phone and/or the mobile phone assigned to the specified party can provide a list of wireless devices (e.g., a list of network names and/or addresses) that are being detected. By leveraging knowledge of the detected wireless devices the location of the specified party may be able to be predicted. For instance, if the desk phone (or wireless beacon) detects the mobile phone there can be an increase in the reachability of the specified party. Conversely, if the desk phone (or wireless beacon) and the mobile phone do not detect each other there is an increased chance that the specified party is away from a desk assigned to the specified party, which can indicate a decrease in the reachability of the specified party. The reachability engine 308 can set IndirectStatusData$_{Wireless}$ to reflect the detection (or lack thereof) of the desk phone and the mobile phone of the specified party. Additionally, IndirectStatusData$_{Wireless}$ can also include a wireless weight factor that may be changed over time by the reachability engine 308 and stored in the profile record of the specified party.

Further, the reachability engine 208 can collect historical status data to determine the reachability for the specified party contributed by the historical status data, HistoricalStatusData, such as characterized in Equation 9. The historical status data can be stored in the profile record of the specified party. Additionally or alternatively, the reachability engine 208 can query an historical records server (e.g., the historical records server 82) for the historical status data, such as a CDR for the specified party. The reachability engine 208 can examine the historical status data to determine the probability that the specified party will accept the request, HistProb. In some examples, the reachability engine 208 can increase or decrease HistProb based on past attempts (if any) by the requesting party or other parties to contact the specified party at the times of day that are indicated in the CDR. Additionally, the reachability engine 208 can adjust the historical weight factor W$_{Hist}$ (included in the profile record of the specified party) based on a number of entries in the CDR. The reachability engine 208 can apply (e.g., multiply) the historical weight factor W$_{Hist}$ to HistProb by as is indicated in Equation 9 to provide the reachability contributed by the historical status data, HistoricalStatusData.

The reachability engine 208 can employ the status data to determine the weighted status data StatusData$_w$ that can, in turn, be employed by the reachability engine 62 to determine/estimate the reachability of the specified party for the requesting party, R$_{id}$ such as indicated in Equations 1-2. Moreover, the reachability engine 208 can store the status data (or some portion thereof) along with the determined reachability for the specified party in the profile database 210 in the profile record associated with the specified party.

In a similar manner, the reachability engine 208 can determine (estimate) an indication reachability for the specified party at a time other than a current time (a time that the requesting party requests contact with the specified party). For example, by employing the techniques described herein, the reachability engine 208 can calculate the expected reachability of the specified party as a function of time. In this situation, the expected reachability as a function of time can be provided to the requesting party, such as to indicate one or more times (e.g., a time window) when the specified party has an expected reachability that exceeds a corresponding reachability threshold. Additionally, the expected reachability as a function of time calculated by the reachability 208 can include data indicating a time (and/or window of time) that the reachability for the specified party is expected to be at a highest level.

Additionally or alternatively, in some examples, if the reachability engine 208 determines that the reachability of the specified party is below a reachability threshold (e.g., 20%) for a given mode of communication being requested by the requesting party, the reachability engine 208 can query an alternative mode engine 212 stored in the memory 202 for one or more suggested alternative mode of communication with the specified party. In response, the alternative mode engine 212 can query an activity tracker (e.g., a server) for alternative mode data associated with one or more alternative modes of communication for the specified party, such as email tracking data, short message tracking data, instant message tracking data and current activity tracking data. The email tracking data can characterize a number of emails generated by the specified party over a given period of time (e.g., 1 month) and a time that each email was sent. The short message tracking data can characterize a number of short messages (SMS messages) sent by the specified party in the given period of time and a time that each short message was sent. Similarly, the instant message tracking data can characterize a number of IMs sent by the specified party during the given period of time and a time that each IM was sent. The current activity tracking data can characterize current activities of the specified party (e.g., indicate that the specified party is currently generating an email, short message or IM). In other examples, the alternative mode engine 212 can access publicly available alternative mode data that is associated with other modes of communication for the specified party.

The alternative mode engine 212 can analyze the alternative mode data (e.g., the email tracking data, the short messaging tracking data, the instant message tracking data and/or current activity tracking data) to determine one or more suggested alternate modes of communication for the specified party. The suggested alternate mode of communication can have a highest determined probability of the specified party responding at the current time. For instance, if the specified party has written many more emails than short messages and/or IMs, the alternative mode engine 212 can set the suggested alternate mode of communication to email. Alternatively, if the specified party is currently generating an IM (indicated by the current activity data), the alternative mode engine 212 can set the suggested alternate mode of communication to IM. Moreover, if multiple modes (e.g., email and short messages) have equal (or nearly) equal probabilities of reachability, a single alternate mode of communication can be selected based on predetermined settings (e.g., preferences of the specified party), which preferences can be specified in the profile record for the specified user. The alternative mode engine 212 can return the suggested alternate mode(s) of communication to the reachability engine 208.

The reachability engine 208 can return the determined reachability for the specified party to the requesting device employed by the requesting party. Additionally, in some situations, the reachability engine 208 can provide the determined expected reachability for the specified party as a function of time and a suggested mode of communication (e.g., voice or the suggested alternate mode of communication) for the specified party to the computing device of the requesting party. The suggested mode of communication can also be stored in the profile record associated with the specified party.

A response tracker 214 stored in the memory 202 can monitor the specified party's response to a subsequent attempt to establish communication (e.g., a phone call, an IM, an email or a short message) with the specified party. For instance, the response tracker 214 can communicate with the CAS and/or the activity tracker to determine whether the specified party responded to the request to establish communication and which mode of communication was employed by the specified party. The response tracker 214 can update the profile record in the profile database 210 and adjust weights of reachability associated with the specified party (e.g., $W_{Profile}$ and $W_{Hist}$) as feedback thereby forming a "learning loop". Thus, over time, multiple requests by the requesting party (or another party) using a particular mode of communication can improve the accuracy of the determined reachability.

The response tracker 214 can also include features for determining the actual actions of the specified party. For instance, the response tracker 214 can include a machine answer detector 215 that can distinguish between an automated response and an actual (e.g., "human") response by the specified party. For instance, if it is detected that the specified party "answers" a phone call, but the phone call is very short (e.g., 8 seconds or less), the machine answer detector 215 can be programmed to indicate that the specified party did not answer the request for voice communication. Similarly, the machine answer detector 215 can communicate with the activity tracker to determine if an automated response (e.g., a "out of the office email") is generated a short time after an alternate mode of communication (e.g., email, IM or short message) is employed to attempt to contact the specified party. In such a situation, the machine answer detector 215 can determine that the specified party did not answer the request for communication (in the suggested alternate mode of communication). Additionally, in a UC system, the response tracker 214 can ascertain whether the request resulted in a voice mail message, such as by receiving status information from a voice mail server.

In a second example (hereinafter, "the second example"), which may be in addition or as an alternative to the functionality disclosed with respect to the first example, the reachability server 200 can be employed to provide assistance in call routing among a plurality of potential users (e.g., a group of representatives in a contact center). The memory 202 can include a reachability application programmable interface (API) 216 that can be configured to allow applications, such as call and/or message routing applications to access the methods implemented by the reachability server 200.

For instance, in a second example, an external program (e.g., a call router) can send (via the reachability API 216) a request for the reachability of multiple users. In response, the reachability API 216 can interface with the reachability engine 208 to determine the reachability for each of the multiple users. Moreover, the reachability API 216 can return a list of users with a reachability above a predetermined threshold (e.g., 40%). In such a situation, the external program may employ the returned information to route incoming calls in a particular order. For instance, the external program can route a call to the RO assigned to the user determined (e.g., by the reachability engine 208) to have the highest reachability.

Additionally, it is noted that the reachability server 200 can be employed in multi-tenant UC systems. In such a situation, each UC tenant can employ an instance of the logic and analytics implemented by the reachability server. Additionally, in some examples, communication related data can be shared among the tenants to further increase the accuracy of a determined reachability for users within each UC system. For instance, presence data between CASs of UC tenants can be shared and leveraged by the reachability engine 208 to determine/estimate the reachability of various users distributed across the multi-tenant system.

Additionally, it is noted that the reachability server 200 can be leveraged in many different ways. In some situations, the request for reachability of the specified party can include parameters that identify particular types of information needed by the requesting party. For instance, the request for reachability can include parameters for a request of a best time and mode of communication to reach the specified party. In such a situation, the reachability engine 208 can determine the expected reachability of the specified party for each possible mode of communication (or some subset thereof) for a window of time, and return the mode of communication with a highest expected reachability and the window of time for the highest expected reachability in the response to the request for reachability. In this situation, the identity of the requesting party may (or may not) be factored into the calculation of the expected reachability of the specified party for each possible mode of communication. Similarly, the request for reachability can include a request for the best communication mode for reaching the specified party in a specific time window (e.g., between 2:00 p.m. and 4:00 p.m. on Thursday). In this situation, the reachability engine 208 can determine the expected reachability for each possible mode of communication (or some subset thereof) and over the specific window of time. Additionally, the reachability engine 208 can return a mode of communication with a highest expected reachability over the specified window of time in the response to the request for reachability.

In other examples, the request for reachability can include parameters for a request for a best window of time to reach the specified party using a specific mode of communication. In this situation, the reachability engine 208 can calculate the expected reachability over a window of time in the future using the specified mode of communication. Moreover, the reachability engine 208 can return a sub-window of time of the window of time in the future that the specified party has the highest level of expected reachability as a response to the request for reachability.

In still other examples, the request for reachability can include parameters for a specified duration of communication with the specified party. For instance, the request for reachability can include data indicating that 10 minutes of communication time is needed with the specified party. In this situation, the reachability engine 208 can determine a best time and mode of communication for reaching the specified party. In particular, the reachability engine 208 can calculate an expected reachability of the specified party over a window of time in the future for each possible mode of communication (or some subset thereof). Additionally, the reachability engine 208 can identify a window of time in the future that is at least as large as the specified duration of communication where a reachability has a highest average. The reachability 208 can return the identified window of time (that is at least as large as the specified duration) and the corresponding mode of communication that has the highest average reachability.

Furthermore, the request for reachability can include a request for a historical reachability for the specified party for each possible mode of communication (or some subset thereof) at a current time (that the request for reachability is sent). In such a situation, the reachability engine 208 can calculate the reachability of the specified party for each mode of communication and more heavily weigh factors related to the historical status data, HistoricalStatusData and reduce and/or remove the weight given to other portions of the StatusData$_w$, such as the DirectStatusData. Still further, other combinations of a parameters in the reachability request can be included. In particular, the parameters can include a request for reachability of the specified party based on a combination of a specified requesting party, a specified time window and/or a specified mode of communication.

Thus, by employment of the reachability server 200, the reachability of users can be efficiently determined/estimated via one or more available modes of communication for each respective user. In this manner, the requesting party or program can leverage the reachability of users to decide whether to attempt to contact specified parties and/or route calls. Additionally, the reachability server 200 can provide a suggested alternate mode of communication incoming communication requests via one mode are unlikely to reach the intended specified parties.

Figure 3:
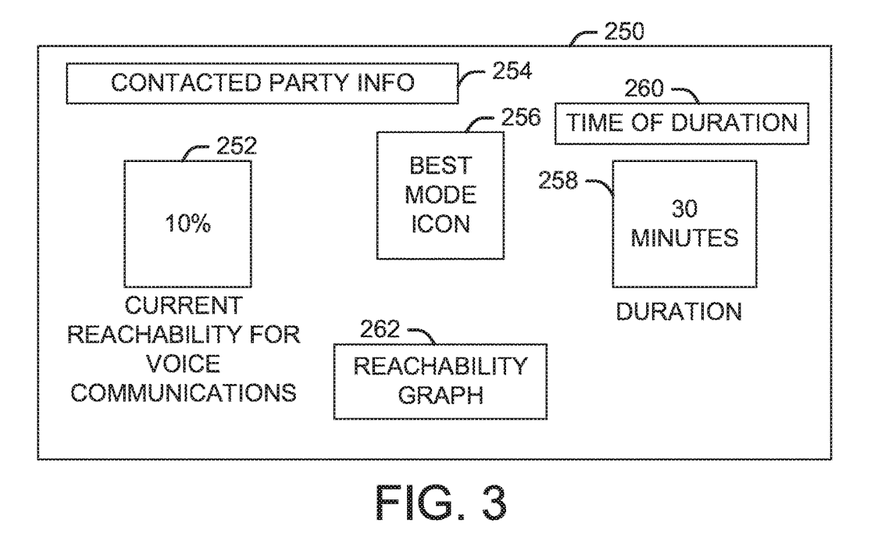
FIG. 3 illustrates an example of a screenshot of a graphical user interface on a client that receives a reachability of a specified party.

FIG. 3 illustrates an example of a GUI 250 that could be implemented by a client (e.g., application software) operating on a client computing device (e.g., the client computer 58 of FIG. 1) that provides a reachability output 252 for a specified party. The GUI 250 output in FIG. 3 can be displayed, for example, after a requesting party has received reachability data for the specified party from a reachability server (e.g., the reachability server 52 of FIG. 1 and/or the reachability server 200 of FIG. 2) in response to a request provided from the client. The GUI 250 can include contacted party information 254 about the specified party. The contacted party information 254 includes data associated with the specified party. For instance, the contacted party information 254 can include a contact number (e.g., a telephone number) of the specified party, a name of the specified party and a location of the specified party.

Additionally, the reachability output 252 can be displayed as a numeric percentage (10% in FIG. 2). Moreover, the reachability output 252 represents the current reachability for voice communications. The GUI 250 can also include a best mode icon 256. Additionally or alternatively, the reachability output 252 could be a graphical representation (e.g., a percentage bar) of the reachability of the specified party.

The best mode icon 256 can characterize a current predicted best mode of communication for reaching the specified party. In the example illustrated in FIG. 3, it is presumed that the current reachability of the specified party via a particular mode of communication (e.g., voice to office desk phone) is below a threshold (e.g., 25%) and the best mode icon 256 can represent a suggested alternate mode of communication provided from the reachability server. Thus, the best mode icon 256 could be an icon representing email, a short message or an IM for each mode via which the specified party has been determined to be reachable above a prescribed threshold. Additionally, best mode icon 256 can specify the estimated reachability for each such alternative mode. In some examples, the best mode icon 256 can provide an interactive GUI element (e.g., a virtual button) that can initiate communication via the respective communication mode in response to a user input activating the GUI element.

Further, the GUI 250 can include a duration 258, which can be computed by the reachability engine (e.g., the reachability engine 62 of FIG. 1). The duration 258 can represent either (i) a duration of time that the specified party's reachability is expected to remain below the threshold or (ii) a duration of time that the specified party's reachability is expected to remain above the threshold. In the example illustrated in FIG. 3, the duration 258 reads "30 minutes." Thus, the duration 258 can indicate that in 30 minutes, the specified party is expected have a reachability greater than the threshold. The GUI 250 can also include a time of duration 260 that can characterize a time of day for the duration 258. For instance, the time of duration 260 could read 7:30-8:30. Moreover, the GUI 250 can include a virtual button (or other GUI element) 262 that (when actuated by clicking or touching on a display) outputs a reachability graph.

Figure 4:
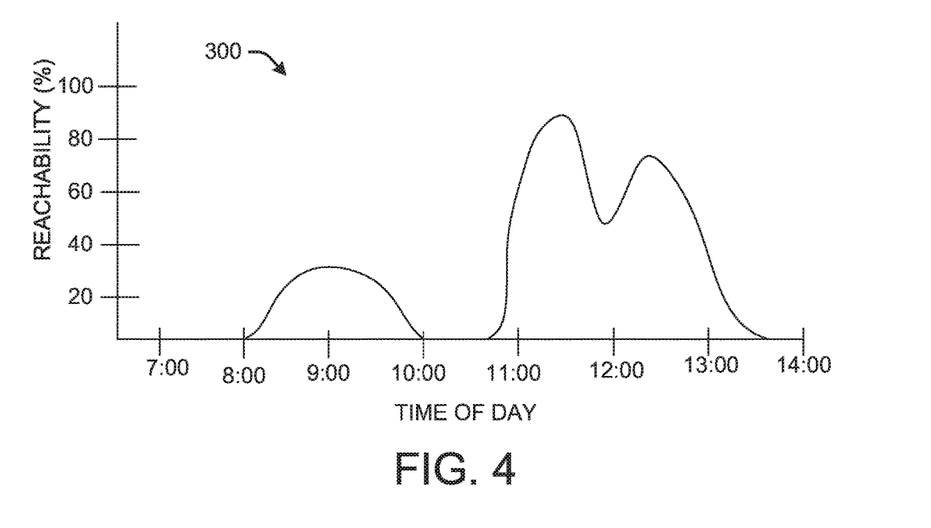
FIG. 4 illustrates an example of a graph that plots a reachability of a specified party as a function of a time of day.

FIG. 4 illustrates an example of a reachability graph 300 that can be output by the GUI 250 of FIG. 3 in response to actuation of the virtual button 262. The graph 300 plots the expected reachability in percentage of the specified party as a function of time of day. From the graph 300, the requesting party can quickly ascertain times throughout the day that the specified party is likely to be reachable and times of the day that the specified party is not likely to be reachable.

Figure 5A:
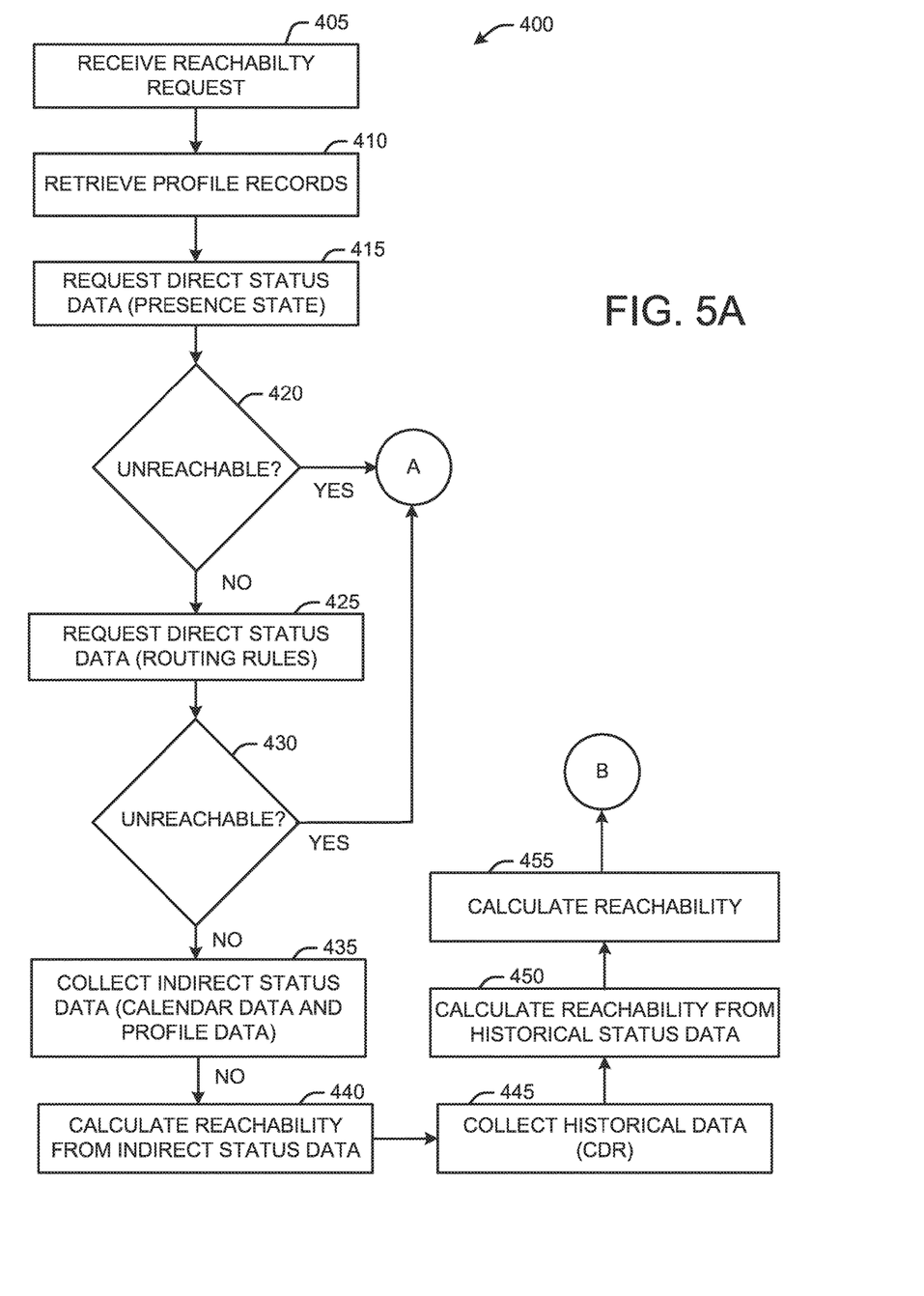
FIGS. 5A-5B illustrate a flowchart of an example method for determining a reachability of a specified party.
Figure 5B:
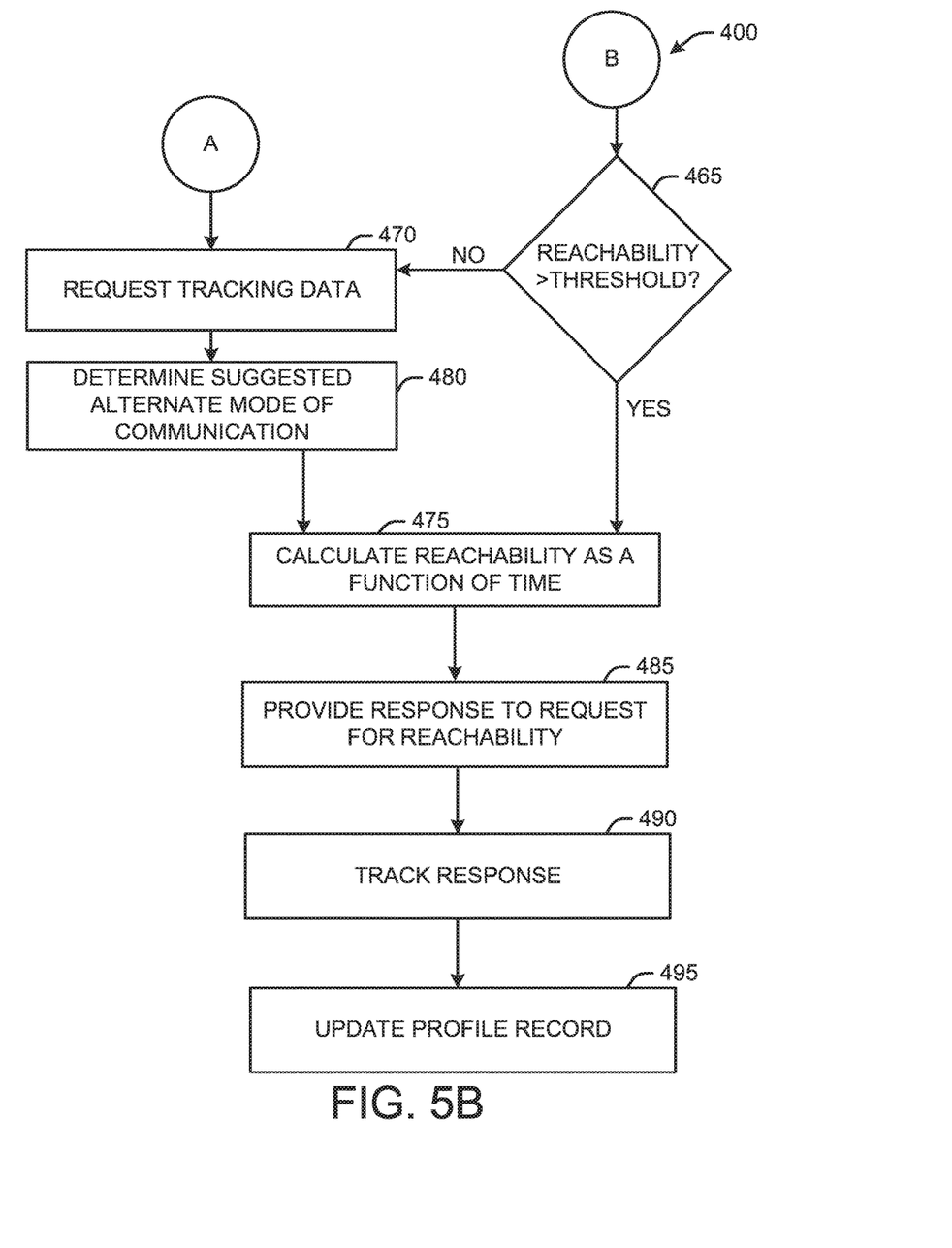

In view of the foregoing structural and functional features described above, example methods will be better appreciated with reference to FIGS. 5A and 5B. While, for purposes of simplicity of explanation, the example methods of FIGS. 5A and 5B are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example methods of FIGS. 5A and 5B can be implemented as instructions stored in a non-transitory machine-readable medium. The instructions can be accessed by a processing resource and executed to perform the methods disclosed herein.

FIGS. 5A and 5B illustrate a flowchart of an example method 400 of determining a reachability for a specified party. The method 400 can be implemented, for example, by the system 50 of FIG. 1 and/or the reachability server 200 of FIG. 2.

At 405, a reachability request can be received at the reachability server. The reachability request can include a unique identifier of the specified party and the requesting party. At 410, in response to the request, the reachability server can retrieve a profile record for the specified party and the requesting party from a profile database. For example, the profile for the specified party can be maintained in a UC system in which the specified party is registered as a user for one or more ROs, such as disclosed herein. In some examples, the UC system can be implemented as a contact center in which the specified party is one of a plurality of users.

At 415, the reachability server can request direct status data. In particular, the reachability server can provide a request for a presence state for the specified party to a CAS (e.g., the CAS 68 of FIG. 1). At 420, a determination can be made (e.g., by reachability engine 62, 208) as to whether the presence state of the specified party indicates that the specified party is unreachable. As mentioned, a determination of unreachable can be an absolute determination or a reachability value that is less than threshold. If the determination at 420 is positive (e.g., YES), the method 400 can proceed to node 'A'. If the determination at 420 is negative (e.g., NO), the method 400 can proceed to 425.

At 425, the reachability server can request additional direct status data. In particular, at 425, the reachability server can request (e.g., from a CAS 68) routing rules for the specified party. At 430, a determination can be made (e.g., by reachability engine 62, 208) as to whether the routing rules for the specified party indicate that the specified party is unreachable. If the determination at 430 is positive (e.g., YES), the method 400 can proceed to node 'A'. If the determination at 430 is negative (e.g., NO), the method 400 can proceed to 435.

At 435, the reachability server can collect indirect status data for the specified party. The indirect status data can include, for example, data stored in the profile record of the specified party (e.g., in profile database 64). Additionally, the indirect status data can include calendar data provided from an email and calendar server (e.g., the email and calendar server 82) and profile data retrieved from a directory server (e.g., the directory server 80 of FIG. 1) and/or external sources (e.g., search engines). Further the indirect status data can include wireless data characterizing wireless devices detected by ROs assigned to the specified party. At 440, the reachability contributed by the indirect status data can be calculated. The reachability contributed by the indirect status can be, for example, a reachability contributed by the calendar data (e.g., calendar events), a reachability contributed by the profile data and a reachability contributed by the wireless data. As mentioned, the reachability associated with different data can be weighted differently.

At 445, the reachability server can collect historical status data. The historical status data can include, for example, data stored in the profile record of the specified party and/or data, such as a CDR for the specified party retrieved from a historical records server (e.g., the historical records server 82 of FIG. 1). At 450, the reachability contributed by the historical status data can be calculated. At 455, the (aggregate) reachability of the specified party can be calculated. Moreover, the method 400 can proceed to node 'B'.

Node 'B' leads to 465. At 465, the reachability server can make a determination as to whether the calculated reachability is above a threshold (e.g., 25%). If the determination at 465 is negative (e.g., NO), the method 400 proceeds to 470. Additionally, node 'A' also leads to 470. If the determination at 465 is positive (e.g., YES), the method 400 can proceed to 475. It is noted that in other examples, the method 400 can altered such that the method proceeds to 470 even if the determination at 465 is positive (e.g., YES).

At 470, the reachability server can request tracking data for the specified party from an activity tracker (e.g., the activity tracker 87 of FIG. 1). At 480, the reachability server can determine a suggested alternative mode of communication (e.g., email, IM or short message) based on the tracking data.

At 475, the reachability server can calculate an expected reachability for the specified party as a function of time (e.g., multiple time instances or a time window). At 485, the reachability server can provide a response to the request for reachability for the specified party. The response can include the calculated reachability for a current time, the expected reachability of the specified party as a function of time and one or more suggested modes of communication (e.g., either voice or another suggested mode of communication based on the reachability). At 490, the reachability server can track a response of the specified party to a subsequent attempt to establish communications. At 495, the reachability server can update the profile record for the specified party. The updating can include, for example, updating stored weight factors based on the tracked response (or lack thereof) by the specified party.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium storing machine readable instructions comprising:
   a reachability engine executed by a processing unit that determines a reachability for a specified party in response to a request for reachability from a client computing device, wherein the reachability characterizes a first probability that the specified party will answer a request for communication using a specified mode of telecommunication at a given time, and wherein the reachability further characterizes a second probability that the specified party will answer the request for communication using an alternate mode of telecommunication, and wherein the first probability and the second probability are above zero percent and less than one-hundred percent;

wherein the reachability engine displays the determination of reachability to an interactive graphical user interface on the client computing device on a reachability output view of the interactive graphical user interface;

wherein the interactive graphical user interface displays information representing a duration of time that the reachability of the specified party is expected to remain above or below a threshold on a duration output view of the interactive graphical user interface;

wherein the interactive graphical user interface includes an element to initiate electronic communication with the specified party via the specified mode of telecommunication or the alternate mode of telecommunication; and wherein the reachability is based on status data that characterizes an aggregate of at least two of direct status data characterizing a presence state of the specified party, indirect status data and historical status data for the specified party, the status data being maintained in a profile database within a reachability server and obtained from a plurality of database servers connected to a network, wherein the presence state characterizes at least a willingness of the specified party to communicate using voice communications.

2. The medium of claim 1, wherein the presence state further characterizes an ability of the specified party to communicate using voice communications.

3. The medium of claim 2, wherein the presence state of the specified party characterizes a real-time status of at least one of a plurality of communication devices assigned to the specified party.

4. The medium of claim 2, wherein the direct status data further characterizes routing rules for a communication device assigned to the specified party.

5. The medium of claim 4, wherein the routing rules include routing rules for at least two communication devices assigned to the specified party.

6. The medium of claim 1, wherein the indirect status data characterizes calendar data that includes a calendar event for the specified party.

7. The medium of claim 6, wherein the reachability engine increases the reachability in response to determining that the calendar event characterizes a meeting that includes the specified party and a party that provided the request for reachability.

8. The medium of claim 1, wherein the historical status data characterizes a call detail record for the specified party.

9. The medium of claim 1, wherein the instructions further comprise an alternative mode engine that determines the second probability in response to the reachability engine determining that the first probability for the specified party is less than a threshold level.

10. The medium of claim 1, wherein the reachability engine further calculates an expected reachability for the specified party as a function of time for a specified window of time.

11. The medium of claim 10, wherein the reachability engine further determines a sub-window of time in the specified window of time that the expected reachability for the specified party is expected to be at a highest level for the specified mode of communication.

12. The medium of claim 1, wherein the reachability engine further retrieves a profile record for the specified party in response to the request, wherein the profile record includes a weight factor that the reachability engine applies to at least one of the indirect status data and the historical status data in determining the reachability.

13. The medium of claim 12, wherein the medium further comprises a response tracker that tracks a subsequent attempt to establish communication with the specified party.

14. The medium of claim 13, wherein the response tracker further comprises a machine answer detector that detects that an automated response is provided in response to the subsequent attempt to establish communication with the specified party.

15. The medium of claim 13, wherein the reachability engine is further to update the weight factor in response to detecting an answer from the specified party in response to the subsequent attempt to establish communication.

16. The medium of claim 12, wherein the profile record indicates that the specified party is assigned to a ring group of a plurality of parties and the reachability for the specified party corresponds to a union of a reachability of each party in the plurality of parties of the ring group.

17. The medium of claim 1, wherein the instructions further comprise a reachability application programming interface (API) that provides access to the reachability engine.

18. The medium of claim 1, wherein the reachability engine is further to query a directory server for profile data that corresponds to a portion of the indirect status data, wherein the profile data characterizes at least one of a job title, an area of expertise, a department and a role of the specified party and wherein the reachability engine increases a weight of the indirect status data in response to the profile data of the specified party indicating a hierarchical business relationship with a party that provided the request for reachability.

19. The medium of claim 1, wherein the reachability engine further retrieves a profile record for the specified party in response to the request, wherein the profile record includes an indication that the specified party is assigned to an automated response generator that causes the reachability engine to set the reachability for the specified party to a level above a threshold.

20. The medium of claim 1, wherein the reachability for the specified party includes data indicating a historical reachability for the specified party using each of a plurality of modes of communication at a time of day that the request for reachability is received by the reachability engine.

21. The medium of claim 1, wherein the indirect status data characterizes wireless devices detected by at least two resource objects assigned to the specified party.

22. A reachability server comprising:
a memory configured to store machine readable instructions; and
a processing unit configured to access the memory and execute the machine readable instructions, the machine readable instructions comprising:

a reachability engine that:
  receives a request for reachability from a client computing device, wherein the request includes a unique identifier of a specified party;
  determines, in response to the request for reachability, an expected reachability for the specified party as a function of time over a window of time in a future, wherein the expected reachability of the specified party characterizes a first probability that the specified party will answer a request for communication using a specified mode of telecommunication, and wherein the reachability further characterizes a second probability that the specified party will answer the request for communication using an alternate mode of telecommunication, and wherein the first probability and the second probability are above zero percent and less than one-hundred percent, and wherein the expected reachability is based on status data characterizing at least a presence state of the specified party that is maintained in a profile database within the reachability server and obtained from a plurality of database servers connected to a network, wherein the presence state characterizes at least a willingness of the specified party to communicate via a given mode of communication;
  provides a response to the request that includes the expected reachability, wherein the response to the request is displayed on an interactive graphical user interface on the client computing device on a reachability output view of the interactive graphical user interface;
  displays information representing a duration of time that the expected reachability of the specified party is expected to remain above or below a threshold on a duration output view of the interactive graphical user interface; and
  wherein the interactive graphical user interface includes an element to initiate electronic communication with the specified party via the specified mode of telecommunication or the alternate mode of telecommunication.

23. The reachability server of claim 22, wherein the reachability engine determines the reachability for the specified party for a given time in further response to the request for reachability, and wherein the status data further characterizes an aggregate of at least two of direct status data, indirect status data and historical status data for the specified party.

24. The reachability server of claim 23, wherein the direct status data characterizes presence state of the specified party, wherein the presence state further characterizes an ability of the specified party to communicate via the given mode of communication.

25. The reachability server of claim 22, wherein the expected reachability includes data identifying the window of time in the future where the specified party is expected to have a highest reachability using the specified mode of communication.

26. The reachability server of claim 25, wherein the identified window of time in the future is at least as long as a duration specified in the request for reachability.

27. The reachability server of claim 25, wherein the identified window of time in the future and the specified mode of communication are based in part on an identity of a party that provided the request for reachability.

28. A method comprising:
  determining, by a processing unit at a reachability server, a reachability of a specified party in response to a request from a client computing device, wherein the reachability characterizes a first probability that the specified party will answer a request for communication using a specified mode of telecommunication, wherein the reachability further characterizes a second probability that the specified party will answer the request for communication using an alternate mode of telecommunication, wherein the first probability and the second probability are above zero percent and less than one-hundred percent, and wherein the reachability is based on status data characterizing at least a presence state of the specified party maintained in a profile database within the reachability server and obtained from a plurality of database servers connected to a network, wherein the presence state characterizes at least a willingness of the specified party to communicate via a given mode of communication;
  displaying, by the processing unit from the reachability server, a response to the request that includes the reachability of the specified party to an interactive graphical user interface on the client computing device;
  displaying, by the processing unit from the reachability server, information representing a duration of time that the expected reachability of the specified party is expected to remain above or below a threshold on a duration output view of the interactive graphical user interface;
  wherein the interactive graphical user interface includes an element to initiate electronic communication with the specified party via the specified mode of telecommunication or the alternate mode of telecommunication; and
  tracking, by the processing unit at the reachability server, actions of the specified party to determine whether the specified party answered a subsequent request for communication using the specified mode of telecommunication.

29. The method of claim 28, wherein the status data further characterizes indirect status data corresponding to calendar events for the specified party.

30. The method of claim 28, further comprising outputting, by the processing unit at the reachability server, data characterizing a graph of the reachability in percentage of the specified party as a function of time to the client computing device for display on the interactive graphical user interface.

31. The medium of claim 1, wherein the element is to initiate the electronic communication with the specified party with the mode of telecommunication selected from the specified mode of telecommunication and the alternate mode of telecommunication that is determined to have the highest probability that the specified party will answer the request for electronic communication.

* * * * *